United States Patent
Kleinfelder et al.

(10) Patent No.: US 8,068,850 B1
(45) Date of Patent: Nov. 29, 2011

(54) METHOD OF LOCATING A TRANSMITTER

(75) Inventors: Walter J Kleinfelder, Annapolis, MD (US); James E Meister, North Potomac, MD (US)

(73) Assignee: The United States of America as represented by the Director, National Security Agency, Washington, DC (US)

(*) Notice: Subject to any disclaimer, the term of this patent is extended or adjusted under 35 U.S.C. 154(b) by 939 days.

(21) Appl. No.: 12/074,512

(22) Filed: Mar. 4, 2008

(51) Int. Cl.
H04Q 7/20 (2006.01)

(52) U.S. Cl. ............ 455/456.1; 455/456.6; 455/456.3; 455/404.2; 455/432.1; 455/435.1; 342/457; 342/450; 342/453

(58) Field of Classification Search .............. 455/456.1, 455/456.6, 404.2, 432.1; 342/450, 457, 453
See application file for complete search history.

(56) References Cited

U.S. PATENT DOCUMENTS

| | | | |
|---|---|---|---|
| 5,191,342 A | 3/1993 | Alsup et al. | |
| 5,859,613 A | 1/1999 | Otto | |
| 5,982,808 A | 11/1999 | Otto | |
| 6,600,774 B1 | 7/2003 | Otto | |
| 7,525,484 B2 * | 4/2009 | Dupray et al. | 342/450 |
| 7,764,231 B1 * | 7/2010 | Karr et al. | 342/457 |
| 2006/0019712 A1 * | 1/2006 | Choi | 455/562.1 |

* cited by examiner

*Primary Examiner* — Charles Appiah
*Assistant Examiner* — Randy Peaches
(74) *Attorney, Agent, or Firm* — Eric Froehlich

(57) ABSTRACT

A method of locating a transmitter is disclosed. A communications link is established between multiple receiving stations and a control station, and used with a calibration signal to calibrate out the time delay of the communications link. A radiated signal from an unknown transmitter is received at a receiving station and sent to the control station over the communications link. The time of arrival is recorded. Upon receiving a user input, the communication link switches from transmitting the received radiated signal to transmitting the calibration signal. The start of calibration signal is timed to begin at the same time across all of the receiving stations. The communication link time delay for each link is calculated by subtracting the start time from the received time, and the communication link time delay is subtracted from the received time recorded for the radiated signal. TDOA calculations are made to locate the transmitter.

28 Claims, 2 Drawing Sheets

METHOD OF LOCATING A TRANSMITTER

FIELD OF THE INVENTION

The present invention relates, in general, to indicating the position of radio waves, and, in particular to a method of determining the location of a transmitter.

BACKGROUND OF THE INVENTION

Time difference of arrival (TDOA) is a well known method of locating a transmitter having an unknown location. In a time difference of arrival system, a transmitter can be located on a hyperboloid by knowing the locations of two receiving stations and the difference in the arrival time of the signal at the two receiving stations. The absolute time the signal was transmitted is not needed.

Typically, the receiving station has TDOA circuitry necessary to geolocate a transmitter, which increases the cost operations and is prone to failures at each receiving station.

U.S. Pat. No. 5,191,342 entitled "FIX-TRACKING SYSTEM" discloses a method to determine the location of a transmitter by using the time difference of arrival method and a communications link (telephone line) to communicate received signals to a central, or control station. The method disclosed in U.S. Pat. No. 5,191,342 does not compensate for the error introduced from the time delay of the communications link as the present invention does. U.S. Pat. No. 5,191,342 is hereby incorporated by reference into the specification of the present invention.

U.S. Pat. No. 5,859,613 entitled "SYSTEM AND METHOD FOR GEOLOCATING PLURAL REMOTE TRANSMITTERS," discloses a method of having a plurality of transmitters send a beacon signal to a receiving station at a predetermined time, which may be identified using a geosynchronous satellite. The location of the transmitter is calculated at each receiving station using a TDOA method that is known in the art and the results are transmitted to a central control station over a telephone link. The present invention does not require TDOA circuitry at the receiving stations, as U.S. Pat. No. 5,859,613 does. U.S. Pat. No. 5,859,613 is hereby incorporated by reference into the specification of the present invention.

U.S. Pat. Nos. 5,982,808 and 6,600,774 both entitled "SYSTEM AND METHOD FOR COMMUNICATING WITH PLURAL REMOTE TRANSMITTERS," disclose identifying a plurality of cooperative transmitters by encoding information in a time shifted chirp signal. The present invention does not seek to identify cooperative transmitters, and is directed at identifying uncooperative transmitters. U.S. Pat. Nos. 5,982,808 and 6,600,774 are hereby incorporated by reference into the specification of the present invention.

There exists a need to identify unknown transmitters that have an unknown location and are not cooperative with a receiving station without using expensive TDOA circuitry at each receiving station.

SUMMARY OF THE INVENTION

It is an object of the present invention to provide a method of geolocating uncooperative transmitters at a central control station without requiring TDOA circuitry at each receiving station.

In the present method, a portion of a received signal is transmitted to a control station over a communications link. If the TDOA calculation was initiated using typical prior art methods, the TDOA calculation would include the slowly varying delay from the communications link.

In the present method, a calibration signal is received at a plurality of receiving stations and a communications link is established between the receiving station and a central control station. In addition, a default delay time for the communications link is stored at the control station.

When a transmission from a transmitter is received at two or more of the receiving stations, a portion of the signal is transmitted to the control station over the communications link.

The transmitter can be geolocated using standard TDOA techniques after the time delay of the communications link is subtracted out. This can occur by either subtracting the communications link time delay from the time of arrival of each received signal or by calculating the communications link time difference of arrival for each pair of receiving stations and subtracting the result from the TDOA calculated from the received signal.

Upon receiving a user input, the input of the communications links at the receiving stations used in the TDOA calculations can be switched to the calibration signal. The calibration signal is then transmitted to the control station, and a new communications link time delay is calculated. In alternate embodiments, the communications link delay is an average of individually calculated time delays.

DETAILED DESCRIPTION OF THE INVENTION

The present invention is a method of geolocating uncooperative transmitters at a central control station without requiring time difference of arrival (TDOA) circuitry at each receiving station.

With the increased us of remote operation at receiving stations, the cost of operations is greatly reduced by minimizing the amount of complex equipment located at the receiving station. In the prior art methods, some of the TDOA calculation is done at the multiple receiving stations. With the present invention, TDOA calculations, and the circuitry required to perform the calculations, are done at the central station. This change reduces the cost and complexity of the receiving station. That is to say, in the present invention, the equipment necessary to perform TDOA geolocation of a transmitter is centralized at a central station.

The present invention replaces the circuitry used in TDOA calculations with a communication link back to a central station. As described above, if the prior art method were used, the TDOA calculation would include the error of the time varying delay from the communication link. The present invention is a method of calibrating out the delay from the communication link so that the less expensive approach can be implemented.

Figure 1:
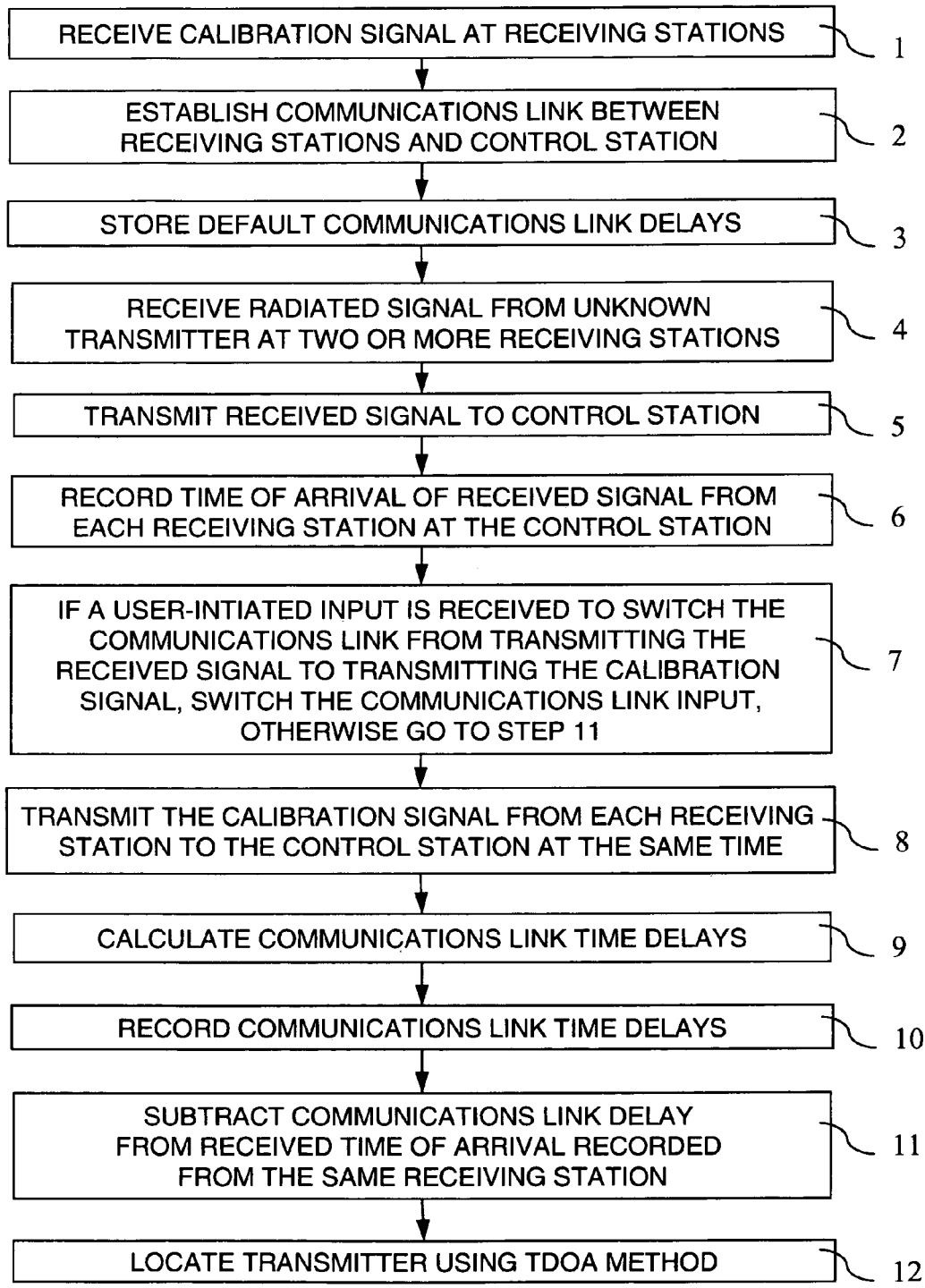
FIG. 1 is a flowchart of steps of the present invention is provided.

FIG. 1 is a flowchart of the steps of the present invention.

The first step 1 of the present method is receiving a calibration signal at two or more receiving stations. The calibration signal is preferably a wideband audio signal, and persons skilled in the art will recognize that any such chirp signal will do. The calibration signal will be used to calculate the time delay due to the communication link between the receiving station and the central station. The accuracy of the communication link's delay is inversely proportional to the bandwidth of the calibration signal. In practice, a standard telephone communications link was used, so a linear FM waveform spanning 300 to 3000 Hz in 6.53 seconds has worked well since a telephone line cuts off at 3000 Hz. As noted above, a wider wideband audio signal would be better, but the choice is limited by the selection of the communication link.

The calibration signal may be stored at the receiving station or continuously received, such as over a radio signal from the control station. Ideally the calibration signal is also reprogrammable.

The second step 2 of the present method is establishing a communications link between a control station and each of the two or more receiving stations. The communications link may be either an analog or a digital communications link, and may be a plain old telephone line, a voice over IP link (VoIP), a satellite link, or other equivalent communications link. The communications link also has a switchable input at the receiving station to transmit either the received calibration signal or a received radiated signal. The switchable input is switched in response to a user-activated signal, which may be manually activated or programmed to switch periodically.

The third step 3 of the present method is storing a communications link delay for each receiving station at the control station. The received communications link delay may be a default value or an expected value.

The fourth step 4 of the present method is receiving a radiated signal from a transmitter having an unknown location. The radiated signal is received by two or more of the receiving stations. Persons skilled in the art will recognize that better accuracy in the resulting geolocation will be achieved if more than two receiving stations are used, specifically, the accuracy is proportional to one over the square root of the number of receiving stations.

The fifth step 5 of the present method is transmitting a user-defined portion of the radiated signal from two or more of the plurality of receiving stations to the control station over the communications links. Persons skilled in the art will recognize that the transmitted signal may be processed before transmission. Such processing may include format conversion, filtering, etc. By a user-defined portion of the radiated signal, the invention means that the entire received signal could be transmitted to the control station, or only a fraction of it.

The sixth step 6 of the present method is recording the time of arrival of each radiated signals at the control station.

In the seventh step 7 of the present method, if a user-activated signal is received to switch the input of the communications links, the input of the communications links that transmitted the radiated signal in the fifth step 5 are switched from the received radiated signal to the received calibration signal. If the user-activated signal is not received, proceeding to the eleventh step 11. To aid the readers understanding of the present invention, the user-activated signal is a control signal to the remote receiving stations telling the receiving stations to switch from the received radiated signal from the unknown transmitter to the calibration signal and thus transmit the calibration signal to the control station. The user-activated signal preferably is sent over the existing communications link.

The eighth step 8 of the present method is transmitting the calibration signal to the control station over the communications link, wherein the start of transmission at each receiving station occurs at the same time. To facilitate the precision timing needed, a timing signal is available to all the receiving stations and the control station at the same time, and is preferably from a satellite system such as the global positioning system in the United States or the proposed European Galileo system.

By way of example, GPS system timing receivers issue 1 pulse per second strobes within 100 ns of each other. In the present method, because GPS timing receivers maintain phase coherence across their 10 MHz outputs, the audio output of any given device is essentially synchronous with the output of any other device at a different location. This insures that a correlation process will correctly measure the communications link delay. Because of the high signal to noise ratio one has over a communication link such as a telephone line, and the 100 ns RMS GPS accuracy, the communications link delays can be calculated with accuracies in the microseconds, yielding geolocations in the less than ten mile accuracy range across thousands of miles of distances.

The ninth step 9 of the present method is calculating the communications link delay for each receiving station by subtracting the start time from the time the calibration signal from each receiving station was received.

The tenth step 10 of the present method is recording the calculated communications link delay for each receiving station at the control station. The calculated communications link delay may overwrite the previously stored communications link delay or be saved in a separate location.

In the eleventh step 11 of the present method, for each recorded time of arrival of the radiated signal from the two or more receiving stations, subtracting the communications link delay for the respective receiving station from the recorded time of arrival of the radiated signal for the respective receiving station.

In an alternate embodiment, the calculated communications link delays for a particular communications link are averaged and the average communications link delay is used in the eleventh step 11 instead of the last calculated communications link delay.

The twelfth, and final, step 12 of the present method is locating the unknown transmitter by calculating the time difference of arrival of the radiated signal from the at least two receiving stations.

In another alternate embodiment, the calibration signal is used to measure the frequency response of the communications link between the control station and each of the receiving stations. A link like a telephone line represents a dispersive medium to the signal, which imparts different delays as a function of the signal frequency. This dispersion causes the correlation calculation, which produces the estimate of the calibration delay times, to be inaccurate. Knowing the frequency response of the link permits compensation for the dispersion, i.e., calibrate the calibration.

In order to compensate for the dispersion, the user takes the Fourier transform of the signal received at the control station and compare it to the Fourier transform of the designed signal. The "difference," actually the quotient of the two transforms tells exactly the frequency response of the communications link.

In an alternate embodiment, it is not necessary to determine the actual communications link delay, but rather, the difference in delay between pairs of communications links from the control station.

Figure 2:
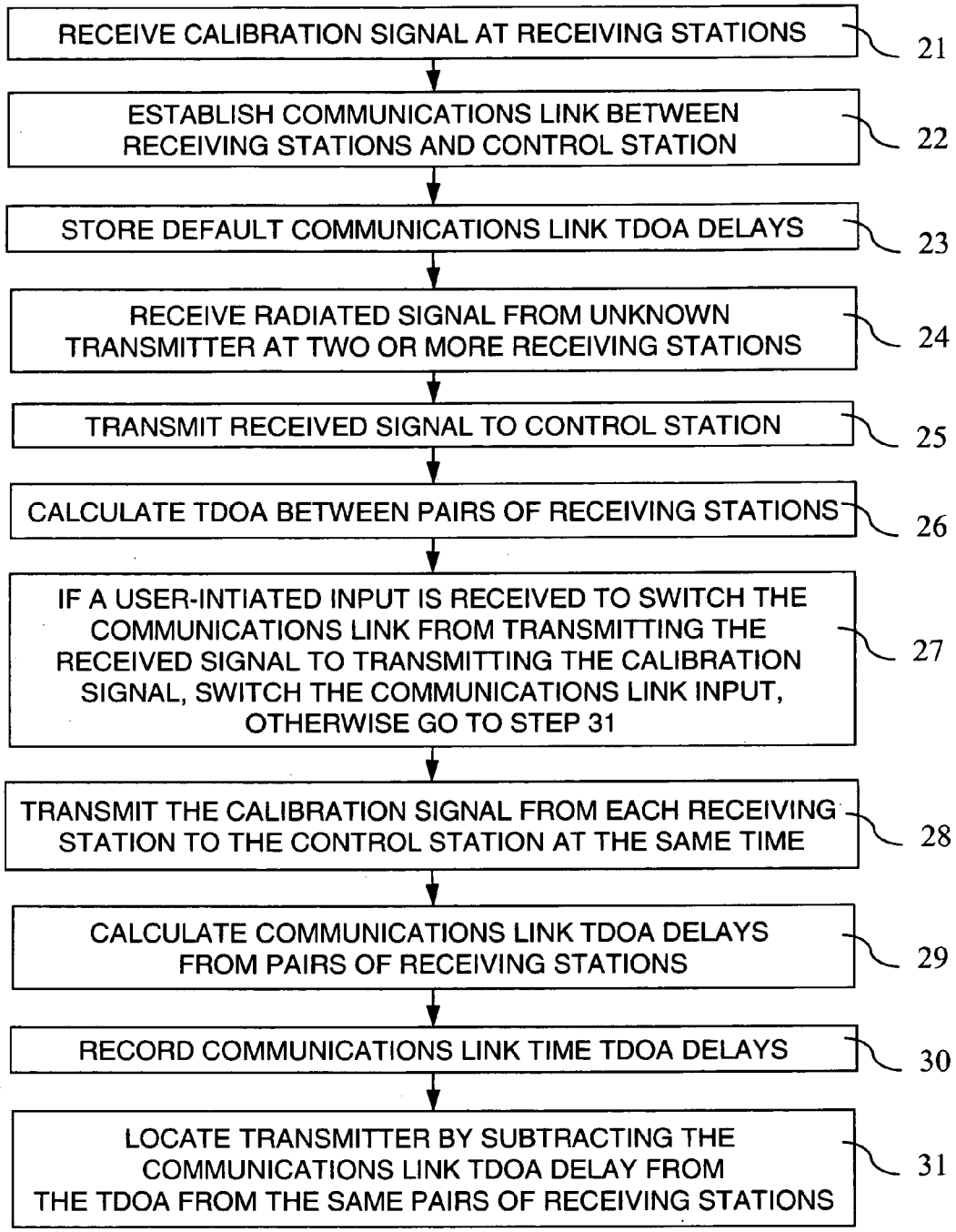
FIG. 2 is a flowchart of an alternate embodiment of the invention.

A flowchart of the alternate embodiment is shown in FIG. 2.

The first step 21 of the alternate embodiment is receiving a calibration signal at two or more receiving stations. The calibration signal may be stored at the receiving station or continuously received, such as over a radio signal from the control station.

The second step 22 of the alternate embodiment is establishing a communications link between a control station and each of the two or more receiving stations. The communications link may be either an analog or a digital communications link, and may be a plain old telephone line, a voice over IP link, a satellite link, or other equivalent communications link. The communications link also has a switchable input at the receiving station to transmit either the received calibration signal or a received radiated signal. The switchable input is switched in response to a user-activated signal, which may be manually activated or programmed to switch periodically.

The third step 23 of the alternate embodiment is storing a communications link time difference of arrival for pairs of receiving stations at the control station.

The fourth step 24 of the alternate embodiment is receiving a radiated signal from a transmitter having an unknown location, the radiated signal received by at least two of the plurality of receiving stations.

The fifth step 25 of the alternate embodiment is transmitting a user-defined portion of the radiated signal from at least two of the plurality of receiving stations to the control station over the communications links.

The sixth step 26 of the alternate embodiment is calculating the time difference of arrival of the radiated signal from the at least two receiving stations.

In the seventh step 27 of the alternate embodiment, if a user-activated signal is received to switch the input of the communications links, switching the input of the communications links that transmitted the radiated signal in the fifth step 25 from the received radiated signal to the received calibration signal, otherwise proceeding to the eleventh step 31.

The eighth step 28 of the alternate embodiment is transmitting the calibration signal to the control station over the communications link, the transmission of the calibration signal at each of the receiving stations in the seventh step 27 timed to begin at the same time using a timing signal. The timing signal is available to all the receiving stations and the control station at the same time, and is preferably from a satellite system such as the global positioning system in the United States or the proposed European Galileo system.

The ninth step 29 of the alternate embodiment is calculating the communications link time difference of arrival for each pair of receiving stations that transmitted the calibration signal in the eighth step 28.

The tenth step 30 of the alternate embodiment is recording the calculated communications link time difference of arrival for each pair of receiving stations at the control station.

In an alternate embodiment, the calculated communications link time difference of arrival for each pair of receiving stations are averaged and the average calculated communications link time difference of arrival for each pair of receiving stations is used in the tenth step 30 instead of the last calculated communications link time difference of arrival for each pair of receiving stations.

The eleventh, and final, step 31 of the alternate embodiment is locating the unknown transmitter by subtracting the communications link time difference of arrival for the pair of receiving stations from the time difference of arrival of the radiated signal from the at least two receiving stations.

In another alternate embodiment, the calibration signal is used to measure the frequency response of the communications link between the control station and each of the receiving stations, as described above.

While the preferred embodiments of the invention have been illustrated and described, it will be apparent to those of ordinary skill in the art that various changes and modifications may be made without deviating from the inventive concepts set forth above.

What is claimed is:

1. A method of locating a transmitter, comprising the steps of:
   a) receiving a calibration signal at a plurality of receiving stations;
   b) establishing a communications link between a control station and each of the plurality of receiving stations, the communications link having a switchable input at the receiving station to transmit one of a received radiated signal and the received calibration signal, the switchable input switched in response to a user-activated signal;
   c) storing a communications link delay for each receiving station at the control station;
   d) receiving a radiated signal from a transmitter having an unknown location, the radiated signal received by at least two of the plurality of receiving stations;
   e) transmitting a user-defined portion of the radiated signal from at least two of the plurality of receiving stations to the control station over the communications links;
   f) recording the time of arrival of each radiated signals at the control station;
   g) if a user-activated signal is received to switch the input of the communications links, switching the input of the communications links that transmitted the radiated signal in step (e) from the received radiated signal to the calibration signal, otherwise proceeding to step (k);
   h) transmitting the calibration signal to the control station over the communications link, the transmission of the calibration signal at each of the receiving stations in step (g) timed to begin at the same time using a timing signal;
   i) calculating the communications link delay for each receiving station by subtracting the start time from the time the calibration signal from each receiving station was received;
   j) recording the calculated communications link delay for each receiving station at the control station;
   k) for each recorded time of arrival of the radiated signal from the at least two receiving stations, subtracting the communications link delay for the respective receiving station from the recorded time of arrival of the radiated signal for the respective receiving station; and
   l) locating the unknown transmitter by calculating the time difference of arrival of the radiated signal from the at least two receiving stations.

2. The method of claim 1, wherein the timing signal is obtained from a satellite available to the plurality of receiving stations and the control station.

3. The method of claim 2, further comprising the step of calculating multiple communications link delays for each receiving station and averaging the communications link delay, the average communications link delay stored at the control station.

4. The method of claim 3, wherein the communications link is one of an analog and digital communications link.

5. The method of claim 4, further comprising calculating a dispersion compensated communications link delay further comprising the steps of:
   a) calculating the Fourier transform of the calibration signal received at the control station;
   b) calculating the Fourier transform of the calibration signal designed to be sent by the receiving station;
   c) determining the frequency response of the communications link by taking the quotient of the two calculated Fourier transforms; and d) calculating the dispersion compensated delay times of the communications link using the frequency response of the communications link to adjust the communication link delay calculated by subtracting the start time from the time the calibration signal from each receiving station was received.

6. The method of claim 5, wherein the communications link is one of voice-over-IP and satellite.

7. The method of claim 5, wherein the communications link is a standard telephone line.

8. The method of claim 5, wherein the switchable input switched in response to a user-activated signal is switched in response to one of a manual command and an automated, periodic command.

9. The method of claim 1, further comprising the step of calculating multiple communications link delays for each receiving station and averaging the communications link delay, the average communications link delay stored at the control station.

10. The method of claim 1, wherein the communications link is one of an analog and digital communications link.

11. The method of claim 1, wherein the communications link is one of voice-over-IP and satellite.

12. The method of claim 1, wherein the communications link is a standard telephone line.

13. The method of claim 1, wherein the switchable input switched in response to a user-activated signal is switched in response to one of a manual command and an automated, periodic command.

14. The method of claim 1, further comprising calculating a dispersion compensated communications link delay further comprising the steps of:
    a) calculating the Fourier transform of the calibration signal received at the control station;
    b) calculating the Fourier transform of the calibration signal designed to be sent by the receiving station;
    c) determining the frequency response of the communications link by taking the quotient of the two calculated Fourier transforms; and
    d) calculating the dispersion compensated delay times of the communications link using the frequency response of the communications link to adjust the communication link delay calculated by subtracting the start time from the time the calibration signal from each receiving station was received.

15. A method of locating a transmitter, comprising the steps of:
    a) receiving a calibration signal at a plurality of receiving stations;
    b) establishing a communications link between a control station and each of the plurality of receiving stations, the communications link having a switchable input at the receiving station to transmit one of a received radiated signal and the calibration signal, the switchable input switched in response to a user-activated signal;
    c) storing a communications link time difference of arrival for pairs of receiving stations at the control station;
    d) receiving a radiated signal from a transmitter having an unknown location, the radiated signal received by at least two of the plurality of receiving stations;
    e) transmitting a user-defined portion of the radiated signal from at least two of the plurality of receiving stations to the control station over the communications links;
    f) calculating the time difference of arrival of the radiated signal from the at least two receiving stations;
    g) if a user-activated signal is received to switch the input of the communications links, switching the input of the communications links that transmitted the radiated signal in step (e) from the received radiated signal to the calibration signal, otherwise proceeding to step (k);
    h) transmitting the calibration signal to the control station over the communications link, the transmission of the calibration signal at each of the receiving stations in step (g) timed to begin at the same time using a timing signal;
    i) calculating the communications link time difference of arrival for each pair of receiving stations that transmitted the calibration signal in step (h);
    j) recording the calculated communications link time difference of arrival for each pair of receiving stations at the control station; and
    k) locating the unknown transmitter by subtracting the communications link time difference of arrival for the pair of receiving stations from the time difference of arrival of the radiated signal from the at least two receiving stations.

16. The method of claim 15, wherein the timing signal is obtained from a satellite available to the plurality of receiving stations and the control station.

17. The method of claim 16, further comprising the step of calculating multiple communications link time difference of arrivals for pairs of receiving station and averaging the communications link time difference of arrivals, the average communications link time difference of arrival stored at the control station.

18. The method of claim 17, further comprising calculating a dispersion compensated communications link time difference of arrival for pairs of receiving stations, comprising the steps of:
    a) for each of the pair of receiving stations sending a calibration signal, calculating the Fourier transform of the calibration signal received at the control station;
    b) calculating the Fourier transform of the calibration signal designed to be sent by each pair of receiving stations;
    c) determining the frequency response of the pair of communications links by taking the quotient of the calculated received calibration signal and designed calibration signal Fourier transforms; and
    d) calculating the dispersion compensated communications link time difference of arrival for each pair of receiving stations that transmitted the calibration signal using the frequency response of the pair of communications links to adjust the calculated communications link time difference of arrival for each pair of receiving stations.

19. The method of claim 18, wherein the communications link is one of an analog and digital communications link.

20. The method of claim 19, wherein the communications link is one of voice-over-IP and satellite.

21. The method of claim 20, wherein the communications link is a standard telephone line.

22. The method of claim 19, wherein the switchable input switched in response to a user-activated signal is switched in response to one of a manual command and an automated, periodic command.

23. The method of claim 15, further comprising the step of calculating multiple communications link time difference of arrivals for pairs of receiving station and averaging the communications link time difference of arrivals, the average communications link time difference of arrival stored at the control station.

24. The method of claim 15, wherein the communications link is one of an analog and digital communications link.

25. The method of claim 15, wherein the communications link is one of voice-over-IP and satellite.

26. The method of claim 15, wherein the communications link is a standard telephone line.

27. The method of claim 15, wherein the switchable input switched in response to a user-activated signal is switched in response to one of a manual command and an automated, periodic command.

28. The method of claim 15, further comprising calculating a dispersion compensated communications link time difference of arrival for pairs of receiving stations, comprising the steps of:
   a) for each of the pair of receiving stations sending a calibration signal, calculating the Fourier transform of the calibration signal received at the control station;
   b) calculating the Fourier transform of the calibration signal designed to be sent by each pair of receiving stations;
   c) determining the frequency response of the pair of communications links by taking the quotient of the calculated received calibration signal and designed calibration signal Fourier transforms; and
   d) calculating the dispersion compensated communications link time difference of arrival for each pair of receiving stations that transmitted the calibration signal using the frequency response of the pair of communications links to adjust the calculated communications link time difference of arrival for each pair of receiving stations.

* * * * *